United States Patent
Allen et al.

(10) Patent No.: US 8,832,164 B2
(45) Date of Patent: Sep. 9, 2014

(54) COMPUTER SYSTEMS USING QUANTUM ALLEGORIES AS ORACLES

(75) Inventors: Edward H. Allen, Lancaster, CA (US); Markos Karageorgis, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1220 days.

(21) Appl. No.: 12/127,540

(22) Filed: May 27, 2008

(65) Prior Publication Data
US 2009/0157778 A1 Jun. 18, 2009

Related U.S. Application Data

(60) Provisional application No. 61/013,291, filed on Dec. 12, 2007.

(51) Int. Cl.
*G06F 7/00* (2006.01)
*B82Y 10/00* (2011.01)
*G06N 99/00* (2010.01)

(52) U.S. Cl.
CPC .............. *B82Y 10/00* (2013.01); *G06N 99/002* (2013.01)

USPC .......................................................... 708/200

(58) Field of Classification Search
None
See application file for complete search history.

(56) References Cited

U.S. PATENT DOCUMENTS

| 2008/0140749 A1* | 6/2008 | Amato et al. ................. 708/490 |
| 2009/0070546 A1 | 3/2009 | Choudhury et al. |
| 2009/0070629 A1 | 3/2009 | Arora et al. |
| 2009/0157778 A1* | 6/2009 | Allen et al. ................... 708/200 |
| 2011/0238378 A1* | 9/2011 | Allen et al. ................... 702/186 |
| 2011/0238855 A1* | 9/2011 | Korsunsky et al. ........... 709/231 |
| 2011/0243411 A1* | 10/2011 | Weiner et al. ................. 382/128 |
| 2013/0060536 A1 | 3/2013 | Sukup et al. |

* cited by examiner

*Primary Examiner* — David H Malzahn
(74) *Attorney, Agent, or Firm* — Baker Botts L.L.P.

(57) ABSTRACT

A computer system includes a deterministic computer that provides a non-recursive functional to a quantum system encoder. The quantum system encoder encodes the non-recursive functional into a first quantum system. The first quantum state is transformed to a second quantum state by an operator that includes a Topological Order Processing Element (TOPE). A quantum allegory generator provides an oracle to the operator.

22 Claims, 2 Drawing Sheets

COMPUTER SYSTEMS USING QUANTUM ALLEGORIES AS ORACLES

BACKGROUND

Strong technology advances in such critical areas as medicine, reliable infrastructure, and security will require strong progress in the development of computational systems able to support the engineering these new technologies will require. Today, engineering methods are ineffective for the most complex and advanced systems foreseen for these areas because of ungainly analytical methods or the complete lack of systematic approaches to designing these systems. This situation was foreshadowed in the middle of the $20^{th}$ Century by the near simultaneous mathematical discoveries of Kurt Gödel and Alan Turing that many problems thought to be addressable by mathematical means could actually never be solved by mathematics. A more intuitive version of what Gödel had called a formal system was defined by Turing in what is known as a Turing Machine (a TM), the archetype of today's digital computers. Turing and others showed that, while all problems subject to computation could be solved with TMs, many of the key problems that need to be solved for the great advances simply cannot be addressed by them or any variant that they could think of. This conclusion has come to be seen, not as a correctable weakness in current computer capabilities, but as profound limitation of mathematics itself. So computers, to the extent that they derive their methods from mathematics alone, may be inadequate no matter how thoroughly they are developed.

Most of the critical computational problems today fall into two sorts: 1) problems for which algorithms are known but take too much time or computational memory to produce useful results with practical resources; these are known as "intractable" problems; and 2) problems which have been proven to be intrinsically unsolvable by computation. The second types of problem are the non-computable problems because recursive functions that solve the problems cannot be found. Such problems are sometimes referred to as "non-recursive" or "non-computable". Vital but intractable and non-recursive problems arise in such endeavors as nanotechnology with complex many-body interactions; bioinformatics where near infinite combinations and permutations must be examined one by one; and individualized medicine, which requires the matching an individual's genetic material, DNA, RNA, and other complex molecules with equally complex therapeutic alternatives.

Less challenging, but perhaps much more urgently needed is the validation and verification of large networked computer programs that run critical social, economic, and defense systems. To date, the best known algorithms and physically realizable computational models indicate that no ordinary computer can make decisive contributions to, much less solve these problems. And while there was hope for a while that the quantum computers, under development in many labs around the world for the past generation, and so tantalizingly near today, would offer crucial breakthroughs, the widely accepted conclusions among specialists is that the quantum computers envisioned today will be no different. These powerful quantum machines, with their lightning speed will put a serious dent in the intractability challenge because they are so fast. In the end, however, they can do no more than mathematics itself. While exponentially faster, quantum computers are impotent in the face of non-recursive problems. Quantum computers can expand the classes of problems that are tractable for solution by TMs, but they cannot expand the classes of problems that are computable.

In many settings, the precise solution merely bestows an economic advantage on those able to find the correct answer. Economic advantage, while a respected attribute within advanced market economies, seldom commands the sometimes large resources required to reach exact solutions. However, there are scenarios where price elasticity is much steeper and thus the claim on attention and resources much greater. These inelastic scenarios include, on a personal level, for example, mapping individual DNA into a precisely customized therapy—something for which the individual would be willing to pay a premium price even if the society would tolerate a lower one. On a social level, inelastic scenarios arise from existential threats. Well-known examples are cryptology and verification and validation (V & V) of critical software, the prime factorization problem, and the halting problem, respectively. Consider such cases as the deciphering of messages between terrorist cells or certifying software for a large nuclear plant or an air traffic system. Society would be willing to pay a premium for these accomplishments.

SUMMARY

In some embodiments, a computer system includes a deterministic computer that provides a non-recursive functional to a quantum system encoder. The quantum system encoder encodes the non-recursive functional into a first quantum system. The first quantum state is transformed to a second quantum state by an operator that includes a Topological Order Processing Element (TOPE). A quantum allegory generator provides an oracle to the operator.

BRIEF DESCRIPTION OF THE FIGURES

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION

Future solutions of crucial problems in national security, personal and public health, economic progress, and others rest on making headway against the "unsolvable" non-recursive problems. Oracles can facilitate more computational power. Some computer theorists have turned to probability theory and the theory of stochastic processes to implement the oracle concept. However, that characterization is not sufficient for Turing showed that if the oracle simply makes random guesses, the o-machine can solve no more problems than a simple Turing Machine without an oracle.

While a Turing Machine blindly follows rote procedures to unenlightened but correct answers, an oracle is intuitive perhaps even imaginative, that is, it offers knowledge without thought or reason—for if reason were involved, clearly it could just be considered part of the Turing Machine and would offer nothing more. The oracle steps in to help out when the TM is stumped, offering crucial guidance. Because the Turing Machine has access to all of mathematics and yet it is so inferior to the oracle, the oracle is a source of heuristic aids not held to ordinary laws of physics, mathematics, or computer science. Oracles are not deterministic by definition.

One way to characterize oracles when viewing them as stochastic devices is by their value as information sources. An oracle where every possible answer is equally probable, that is, where the pronouncement contains the maximum amount of information, is TM-reducible and offers no basis for discriminating the "right" evolution of the program from the rest. Conversely, when the oracle always gives the same answer, it provides no information at all and thus can not boost capability and so, also fails to address the non-recursive problems.

As disclosed herein, non-recursive problems can be solved with infinite-register quantum computers coupled with a unique oracle that is able to modify the Turing Machine consulting it. The novel oracle is a non-adiabatic stochastic processor that accesses a larger dimension set than the binary set accessed by the Turing Machine and provides potentially new elements to the recursive set accessed by the Turing Machine. The oracle can be (or have the same characteristics as) a quantum emulator such as optical lattice emulators (OLEs) that enable the allegory that is a non-recursive quantum oracle.

Figure 1A:
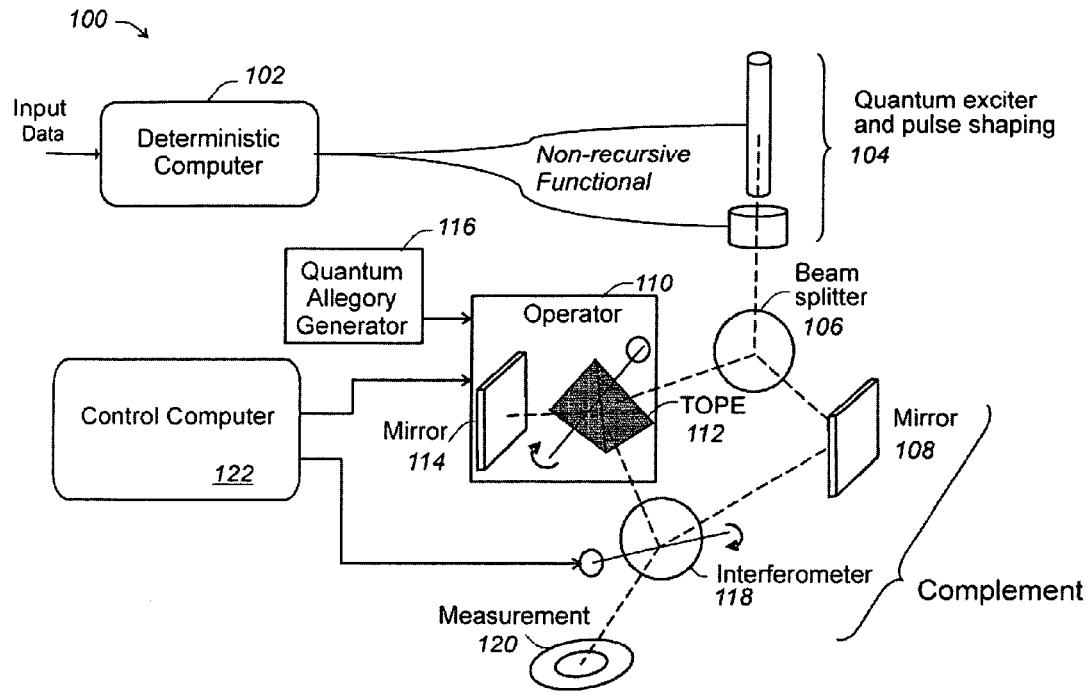
FIG. 1A is a diagram of an embodiment of components included in a quantum computer system using a quantum allegory as an oracle to solve non-recursive functions.

Referring to FIG. 1A, a diagram of an embodiment of components included in a computer system 100 using a quantum allegory as an oracle is shown. System 100 includes data input to a deterministic computer 102 (also referred to as a Turing Machine). Computer 102 can be implemented using any suitable digital processor with hardware, firmware, and/or software components capable of executing logic instructions, receiving input signals, and providing output signals to components in system 100. Computer 102 can alternatively be a quantum computer or other suitable deterministic processing system. If computer 102 determines the problem to be non-recursive, computer 102 supplies a non-recursive functional to quantum system encoder 104. A non-recursive functional is a function that results in a non-recursive real number or is a real non-recursive number or entity. The term non-recursive refers to problems that are incapable of being computed by any deterministic or classical algorithm in any finite amount of time The non-recursive functional is encoded into a first quantum system by quantum system encoder 104. The encoding function may be implemented using attributes such as spin, polarization, or momentum, for example, of quanta such as photons, electrons, atoms, simulated atoms such as quantum dots, and other suitable quanta.

The first quantum system is input to beam splitter 106. One output of beam splitter 106 is provided to a mirror 108, while the other output of beam splitter 106 is provided to an operator 110 that includes Topological Order Processing Element (TOPE) 112 and mirror 114. TOPE 112 can further arrange the entangled quanta in topological orders to help prevent the entangled multiquanta waveforms from decohering as the waveforms are processed through system 100. Further, entanglement renormalization can be used to obtain an effective description for topological states.

Topology refers to mathematical properties that are unchanged when an object is smoothly deformed. Topological ordering refers to using quasi-particles to represent quanta as the quanta move through time and space. The quasi-particles are referred to as anyons. Pairs of adjacent anyons may be moved around one another in a determined sequence to form a thread. With multiple threads, the pairs of anyons can be swapped to produce a braid of all the threads. The final states of the anyons are encapsulated in the braid and are protected from outside disturbances and interference, i.e., decoherence. Non-abelian anyons are typically used so that final states of the anyons depend on the order in which the anyons are swapped. The transformation from one state to another can be represented by a matrix. Different transformations can be used to represent different information and used to encode and decode the information in the anyon braid.

Renormalization group (RG) transformations can be used to obtain an effective description of the large distance behavior of extended systems. In the case of a system defined on a lattice, this can be achieved by constructing a sequence of increasingly coarse-grained lattices, where a single site of lattice effectively describes a block of an increasingly large number of sites in the original lattice. Entanglement renormalization is a RG transformation that uses disentanglers prior to the coarse-graining step to reduce the amount of entanglement in the system. When applied to a large class of ground states in both one and two spatial dimensions, a steady dimension is made possible by the disentangling step. The resulting RG transformation can be iterated indefinitely at a constant computational cost, allowing for the exploration of arbitrarily large length scales. In addition, the system can be compared with itself at different length scales, and thus RG flows can be studied in the space of ground state or Hamiltonian couplings. A constant dimension also leads to an efficient representation of the system's ground state in terms of a tensor network, which is referred to as the multi-scale entanglement renormalization ansatz (MERA).

TOPE 112 can encode information in configurations of different braids, which are similar to knots but consist of several different threads intertwined around each other. By encoding waveforms in braids instead of single particles, TOPE 112 encodes the quanta in phase relations. Further, the waveform can be represented redundantly so that errors can be diagnosed and corrected if the phase relations are disrupted during propagation and/or processing. Entanglement renormalization transformations can be used to reduce the amount of entanglement in the waveforms. See the techniques discussed, for example, in "Entanglement Renormalization and Topological Order" by Miguel Aguado and Guifre Vidal, arXiv:0712.0348v2 [cond-mat.str-el] 21 Feb. 2008, which is incorporated by reference herein. Note that although the preceding publication discusses techniques for abelian quanta, nonabelian quanta can also be used in TOPE 112. The term "abelian" refers to quanta that have commutative properties, whereas "nonabelian" quanta are not commutative. Abelian quanta have commutative properties, while non-abelian quanta do not. In quantum mechanics, commutative means that the outcome is independent of the order of operations. For example, consider two operators, A and B, which change the system in some way (translation, rotation, propagation through time, etc.) If these operators commute with one another, AB|system>=BA|system>. If they do not commute, AB|system> does not equal BA|system>; that is, the outcome of the operations is dependent upon the order in which the operations is performed. If quanta have commutative properties, the outcome of operations performed on them is irrespective of the order of operations, whereas if they do not have commutative properties, the order of operations does matter.

In some embodiments, TOPE 112 includes a crystal metamaterial structure that allows elements of the crystal to be entangled among themselves. The metamaterial thus provides an entangle-able 3-D array of topological quantum systems. In some aspects, TOPE 112 is non-commutative in order to include the non-linearities of non-recursive functions. Candidate TOPEs 112 exhibit topological order, such as ion traps with long range laser interactions, spin deformed networks, frustrated magnetic systems, and photonic Fibonacci lattices. TOPEs 112 can also use anyons like a fractional Hall effects, membranes (e.g., polymers like a biological membranes), string condensate (super lattice 4-d space, plus magnetic impurity and laser excitation), Kaufman nets (3+1, 4-d theories) or quantum loops, and deformed spin networks (d-arbitrary dimensions).

Figure 1B:
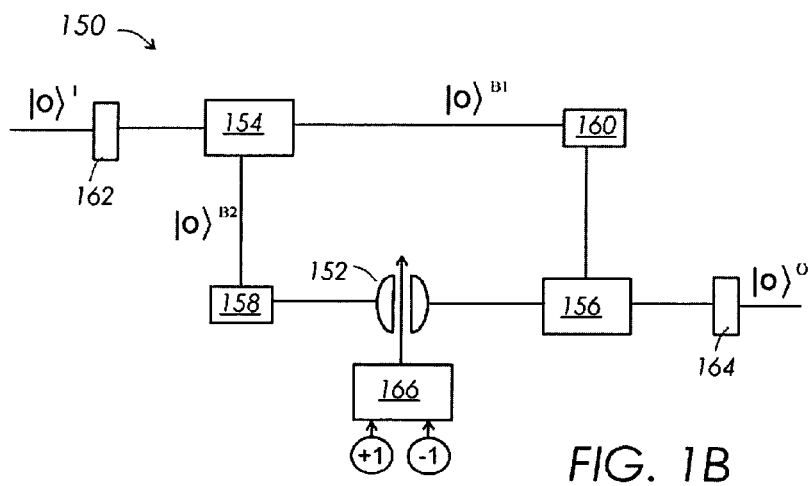
FIG. 1B shows an embodiment of photonic module that can be used to generate topological entangled renormalized quanta.

FIG. 1B shows an embodiment of photonic module 150 that can be used in TOPE 112 to generate topological entangled renormalized quanta. Photonic module 150 can include an atom cavity system 152, polarizing beam splitters (PBS) 154, 156, optical delays 158, 160, and half wave plates (HWP) 162, 164 and is described in detail in "The Photonic Module: an on-demand resource for photonic entanglement" by Simon J. Devitt et al., arXiv:0706.2226v2 [quant-ph] 12 Oct. 2007, which is incorporated by reference herein. Control lasers 166 provide a single photon source, which can produce a train of single photon pulses of known polarization, separated by a specified time interval. Cavity 152 generates two photons that are routed through components in photonic module 150 as a result of the excitation by lasers 166.

For a single photon passing through the module, the natural operation of the module, M, is given by, $$M|+\rangle^I|\phi\rangle \rightarrow |+\rangle^O|\phi\rangle,$$

$$M|-\rangle^I|\phi\rangle \rightarrow |-\rangle^O|\phi'\rangle. \quad \text{(Equation 1)}$$

Where $|\pm\rangle = (|H\rangle \pm |V\rangle)/\sqrt{2}$, $|\phi\rangle = \alpha|0\rangle + \beta|1\rangle$ is the state of the atomic qubit, $|\phi'\rangle = X|\phi\rangle = \alpha|1\rangle + \beta|0\rangle$ and indices $\{I, O\}$ represent input and output optical modes. Cavity system 152 is positioned such that the cavity mode is coupled to a spatial mode $|o\rangle^{B2}$, where o denotes the photon polarization and cavity Q-switching (which allows for the adiabatic loading of a single photon into a cavity) is employed before and after the atom/photon interaction to ensure appropriate in- and out-coupling to and from the cavity system 152. The mode $|o\rangle^{B1}$ contains an optical delay 160 equal to the time required for the photon/atom interaction. A single photon passing through the atom/cavity system 152 induces a photonic non-demolition bit-flip on the two-level atom, releasing the photon again into $|o\rangle^{B2}$ once the interaction is complete.

If the photonic state is $|+\rangle$, HWP 160 rotates the state to $|H\rangle$ after which it will continue into the mode $|o\rangle^{B1}$ and not interact with the atom. The second PBS 154 and HWP 158 will then couple $|o\rangle^{B1}$ to the output mode and rotate $|H\rangle$ back to $|+\rangle$. If the initial photonic state is $|-\rangle$, the HWP 158 will rotate the state to $|V\rangle$ and the PBS 154 will reflect the photon into the $|o\rangle^{B2}$ mode, where it flips the state of the atomic qubit. The photon is then released back into $|o\rangle^{B2}$ where the second PBS 154 and HWP 158 reflect the photon into the output mode and rotate it from $|V\rangle$ to $|-\rangle$. Therefore, the two basis states, $|\pm\rangle$, of a single photon passing through the module will enact the transformation M shown in Equation 1 above.

For a two photon train, the output pulse consists of the original two photon train which is polarization entangled into a two photon Bell state. The measurement result of the atomic-cavity system 152 does not collapse the photons to unentangled states.

Referring again to FIG. 1A, quantum allegory generator 116 can be implemented using Optical Lattice Emulators (OLE) to provide an oracle to operator 110. The OLE can emulate computationally intractable, strongly-correlated, many-body models for which no verifiable theoretical solution or experimental realization. The OLEs can achieve the requirements of a non-recursive oracle. The quantum allegory generator 116 produces a topological order system with some topological invariants. The wave function of topological order systems can be written as a tensor product of the initial wave function (non-recursive functional) and a phase factor. The phase factor is the oracle of the quantum allegory.

The output of mirror 108 and TOPE 112 are provided to interferometer 116. Measurement system 118 measures whether the correct answer to the non-recursive functional has been achieved. Control computer 120 is coupled to provide inputs to control operation of TOPE 112 and interferometer 118. Computer 122 can be implemented using any suitable digital processor capable of executing logic instructions, receiving input signals, and providing output signals to components in system 100

In some implementations, computer 122 adjusts TOPE 112 to generate a quantum allegory and transform the first quantum system into a second quantum system. Computer 122 further adjusts the rotation of interferometer 118, which combines the complement of the encoded non-recursive functional from mirror 108 with the second quantum system from TOPE 112. A "correct" solution to the non-recursive functional is achieved when measurement system 120 determines that phase of the second quantum system is cancelled by the complement of the first quantum system.

Operator 110, whether binary or "n-ary", can implement a property called "closure" to allow the members of a recursive or non-recursive subset to be combined to always stay within the starting subset. In other embodiments, operator 110 can implement movement of elements between subsets or create new subsets by combining elements and mapping them into subsets other than the subset they came from, thus implementing the opposite of closure in a limited sense.

Control computer 122 can be a Turing Machine (TM) that overlies the recursive subset and exclusively uses operators that accept recursive inputs and generates recursive outputs. TMs are closed within recursive space. One novel aspect of defining a TM in this manner is that there are now sufficient TMs to entirely cover the set of possible inputs, that is, there is one TM for each element of the power set of recursive elements. Stated differently, the Turing-Church Thesis is a result of the way a TM is defined in that there exists one TM for each possible recursive input, so the number of such inputs determines the number of TMs. The number of outputs, however, includes both recursive and non-recursive outputs because non-recursive outputs arise naturally from recursive inputs assuming the programs within the TM include the ordinary rules of arithmetic. From these facts, the Turing-Church Thesis falls out of the obvious that if there are fewer inputs than outputs and the number of TMs is defined by the number of inputs, there are fewer TMs than outputs. Some outputs will not find a place to rest and the system must be incomplete. The solution disclosed herein is to define a TM for each output and thus be guaranteed a sufficient diversity to cover the whole set.

To define a TM for each output, consider that an o-machine that excludes non-recursive elements from its input and open operators from its programs must also be closed within the recursive subset. This is true whether or not the oracle is stochastic in nature. However, when the oracle is a stochastic process that may select without restriction from all elements of the global set including non-recursive as well as recursive, the oracle can generate non-recursive pronouncements that enable the TM to cross the border between the recursive and non-recursive subsets to address non-recursive problems. The various combinations of allowable inputs, recursive and non-recursive, and open and closed operators offer numerous opportunities to define a mathematics that has the potential of address recursive and non-recursive problems.

Note that when an element is transported from the non-recursive to the recursive subset it is not changed; the element itself is invariant. All that has changed is the way it is seen. Thus, the key to the oracle is new knowledge, an outside influence or activity of some sort that is based on scientific method. The oracle used herein makes pronouncements based on experimentation in adjusting TOPE 112. When the experiments are classical in character, the oracle's pronouncements are recursive by definition. When the experiments are quantum mechanical in nature, the pronouncements are non-recursive, also by definition. Quantum mechanical experiments are subject to the unique and often counter-intuitive quantum stochasticism of quantum reality. Moreover, it can be argued that no classical oracle can exist that covers the non-recursive set and no quantum oracle can exclude it. The defining architecture of a hypercomputer is a quantum oracle.

One feature of the quantum oracle provided by adjusting TOPE 112 is that the measure defined over the recursive set, if it is to result in a consistent theory of information, can look like and behave like a probability. Recursive elements, then, can have positive probabilities between zero and one. Moreover, if TMs closed into recursive space are to satisfy continuity of information theory, the Data Processing Theorem (DPT), the probabilities sums to one. The sum of the measure over the non-recursive subset or over the global union required to render the quantum allegory model useful and consistent is negative one. The sum over the global union of recursive and non-recursive sets then totals zero. Thus, there exist non-recursive events with probability of occurrence less than zero.

A proper oracle for the solution of non-recursive problems can be a stochastic process able to generate results that, when appropriate, are unexpected in recursive space and, in effect, create a new element of recursive space. Computing the uncomputable thus refers to transporting a non-recursive element into a recursive subset. The appearance of a new element in the recursive set requires the renormalization of the measure over that set to accommodate the new element and to re-establish continuity under the DPT.

A qubit is a generic name for a quantum system that that has two possible states and when measured is seen to take on one of these states randomly. A qubit therefore seems to be a physical implementation of an arbitrarily biased coin and is biased in accordance with the complex coefficients, $\alpha$ and $\beta$, defined with it. Qubits may be represented as $$\psi = \alpha |x_1\rangle + \beta |x_2\rangle$$

where $\alpha$ and $\beta$ are complex and $|x_1\rangle$ and $|x_2\rangle$ correspond to two states of a 2-state quantum system. This characterization of the oracle is a close, if not exact description of a quantum simulator. For example, quantum processes can be represented as linear algebraic operators that express quantum evolution and predict the future state of quantum systems in terms of "amplitudes", which is the basic insight of the Schrodinger equation. In the standard interpretation, the square of amplitude is given the physical meaning of the probability of the given event. Because amplitudes are accounted for in Hilbert space, that is, they evoke both magnitude (the real component of the amplitude) and phase (the imaginary component), amplitudes can be imaginary as well as real. The square of an imaginary number is a negative real number and thus the square of an imaginary amplitude is interpreted as a negative probability. Conversely, a negative probability is the probability of an event in non-recursive space which must be handled in such a way as to generate a consistent information theory of a truly capable oracle and its associated Turing Machine.

Another aspect of this model of a non-recursive oracle is that information encoded in the correlations of the system 100 cannot be extracted immediately. The information can be extracted by performing the entanglement renormalization technique and mapping the information in the nodes of the network that is produced. Carried further, fully reversible computing may not be possible with quantum computing due to topological order and the oracle which is non-Abelian.

The non-recursive oracle receives answers from basic physical laws, not empty random value generators. The quantum laws may be intrinsically stochastic, however, and yet are biased in favor of physical reality (recursive reality). The outcome of a quantum experiment is purely unknown and after the measurement has taken place it is purely known—within the limits allowable by uncertainty and what is referred to as incompatibility.

A non-recursive quantum oracle, then, is a controlled or uncontrolled quantum experiment that yields a result into a TM (whether a classical, quantum, topological TM or other computer) to move the recursive calculation along when the algorithmic approach is blocked for any reason including that the problem may be non-recursive. A non-recursive quantum oracle is not a quantum computer because it is not reversible.

Figure 2:
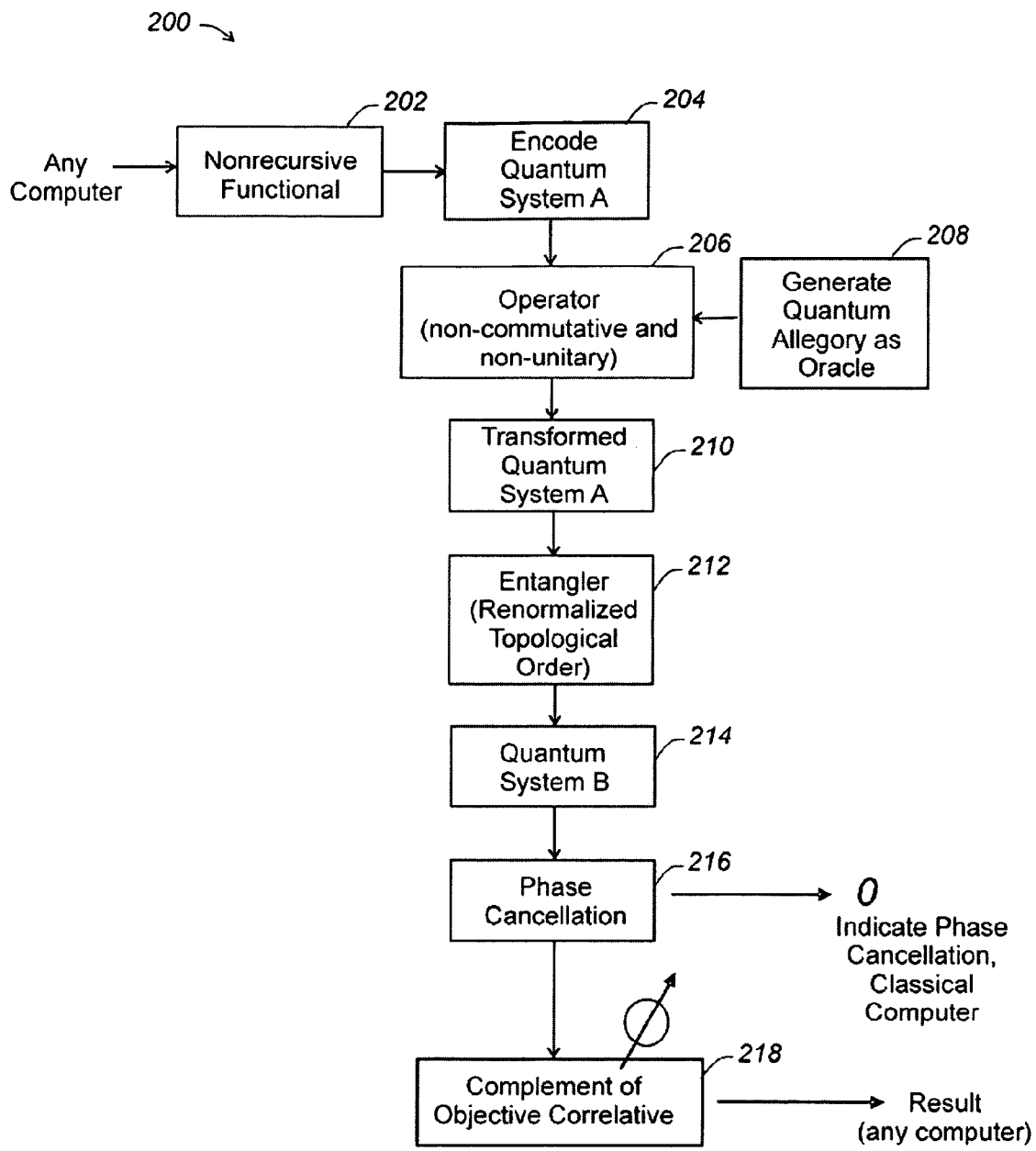
FIG. 2 is a block diagram of an embodiment of a process for using a quantum allegory as an oracle to solve non-recursive functions in a quantum computer system.

FIG. 2 is a block diagram of an embodiment of a process 200 for using a quantum allegory as an oracle in computer system 100 (FIG. 1A). Process 202 includes receiving a non-recursive functional from any type of deterministic computer including classical Turing Machine computers or quantum computers. The non-recursive functional is encoded into a quantum representation, denoted by quantum system A, in process 204. The encoding process may be implemented using attributes such as spin, polarization, or momentum, for example, of photons, electrons, atoms, simulated atoms such as quantum dots, and other suitable quanta.

Processes 206 through 212 include applying an operator and renormalized topological ordering to transform quantum system A to quantum system B. Process 208 can include generating a quantum allegory of quantum system A to use as an oracle. In some embodiments, quantum system A is transformed or rotated in a manner that is pertinent to the non-recursive functional based on the quantum allegory in process 210. Quantum system A is a topological order quantum system. The evolution of quantum system A is governed by a non-commutative, non-unitary operator 110. The relations between the elements of the operator 110 depend on the previous encoding process 204. Using the encoding relation, phase factors can be found that are the topological invariants of the quantum system A. The topological invariants are the quantum allegories that define the transformations of the quantum system A to quantum system B. The quantum allegories are operational procedures that define how the topological wavefunction is going to evolve. The representations (outcomes) of the allegories are the oracles.

Process 212 can include applying topological order to quantum system A generated in process 210. The topological order can encode information in configurations of different braids, which are similar to knots but consist of several different threads intertwined around each other. By encoding waveforms in braids instead of single particles, topological ordering encodes the quanta in phase relations. Further, quantum system A can be represented redundantly so that errors can be diagnosed and corrected if the phase relations are disrupted during propagation and/or processing. Entanglement renormalization transformations can be used to reduce the amount of entanglement in quantum system A. The output of process 212 is quantum system B, as shown by process 214.

Process 216 combines the complement of quantum system A with quantum system B. The process of combining quantum system A and B can be implemented using an interferometer. Process 218 determines whether the complement of quantum system A cancels the phase of quantum system B. If so, a solution to the non-recursive functional has been found. Otherwise, processes 206-218 can be repeated using another quantum allegory as an oracle.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

What is claimed:

1. A computer-implemented method for determining a solution for a non-recursive functional comprising:
receiving a non-recursive functional from a deterministic computer system;
encoding, using a quantum system encoder the non-recursive functional into a quantum system A;
transforming the quantum system A to quantum system B using a quantum allegory operator as an oracle of the solution to the non-recursive functional;
combining a complement of the quantum system A with the quantum system B; and
determining whether the complement of the quantum system A cancels the phase of the quantum system B.

2. The method of claim 1 further comprising:
topologically ordering quantum system A to transform quantum system A to quantum system B.

3. The method of claim 2 further comprising:
renormalizing the topologically ordered quantum system A to transform quantum system A to quantum system B.

4. The method of claim 1 further comprising:
using an interferometer to combine the complement of the quantum system A with the quantum system B, wherein the complement of quantum system A is generated by applying a beam splitter to Quantum system A.

5. The method of claim 1 further comprising:
using another quantum allegory as the oracle if the complement of quantum system A does not cancel the phase of quantum system B.

6. The method of claim 2 further comprising:
using a photonic module to generating a topological entangled renormalized quantum system A before transforming the quantum system A to quantum system B.

7. The method of claim 2 further comprising:
using an Optical Lattice Emulators (OLE) to generate the oracle.

8. A computer system comprising:
a deterministic computer;
a quantum system encoder configured to receive a non-recursive functional from the deterministic computer and to encode the non-recursive functional into a first quantum system;
an operator including a Topological Order Processing Element (TOPE) adjustable to transform the first quantum state to a second quantum state; and
a quantum allegory generator configured to generate and provide an oracle to the operator.

9. The system of claim 8 further comprising:
a beam splitter coupled to receive the first quantum system; and
a first mirror configured to receive one output of the beam splitter, wherein the one output of the beam splitter comprises the complement of the first quantum system.

10. The system of claim 9 further comprising:
an interferometer coupled to receive input from the first mirror and the TOPE, wherein the output of the TOPE comprises the second Quantum system.

11. The system of claim 10 further comprising:
a control computer coupled to provide inputs to control operation of the TOPE and the interferometer.

12. The system of claim 8 further comprising:
a measurement system operable to determine whether a phase of the second quantum system is cancelled by the complement of the first quantum system.

13. The system of claim 8, the TOPE comprising:
a photonic module configured to generate a topological ordered renormalized first quantum system for transforming the first quantum system to a second quantum system.

14. The system of claim 8 further comprising:
the quantum allegory generator includes an Optical Lattice Emulators (OLE).

15. An article of manufacture comprising:
first computer means;
means for encoding a non-recursive functional received from the first computer means into a first quantum system;
means for transforming the first quantum system to a second quantum system; and
means for generating an oracle that is provided to the means for transforming the first quantum state.

16. The system of claim 15 further comprising:
a beam splitter coupled to receive the first quantum system; and
a first mirror configured to receive one output of the beam splitter.

17. The system of claim 16 further comprising:
an interferometer coupled to receive input from the first mirror and the means for transforming the first quantum state to a second quantum state.

18. The system of claim 17 further comprising:
a control computer coupled to provide inputs to control operation of the means for transforming the first quantum state to a second quantum state and the interferometer.

19. The system of claim 15 further comprising:
a measurement system operable to determine whether the phase of the second quantum system is cancelled by the complement of the first quantum system.

20. The system of claim 15 further comprising:
a photonic module configured to generate a topological ordered renormalized first quantum state before transforming the first quantum system to a second quantum system.

21. The system of claim 15 further comprising:
the means for generating the oracle includes an Optical Lattice Emulators (OLE).

22. A computer system comprising:
a deterministic computer;
a quantum exciter and pulse shaper configured to receive a non-recursive functional from the deterministic computer and to encode the non-recursive functional into a first quantum system;
an operator including a photonic module having an atom cavity system adjustable to transform the first quantum system to a second quantum system; and
a lattice emulator configured to generate a topological order system with some topological invariants and provide an oracle to the operator.

* * * * *